TRANSPORTATION SYSTEM

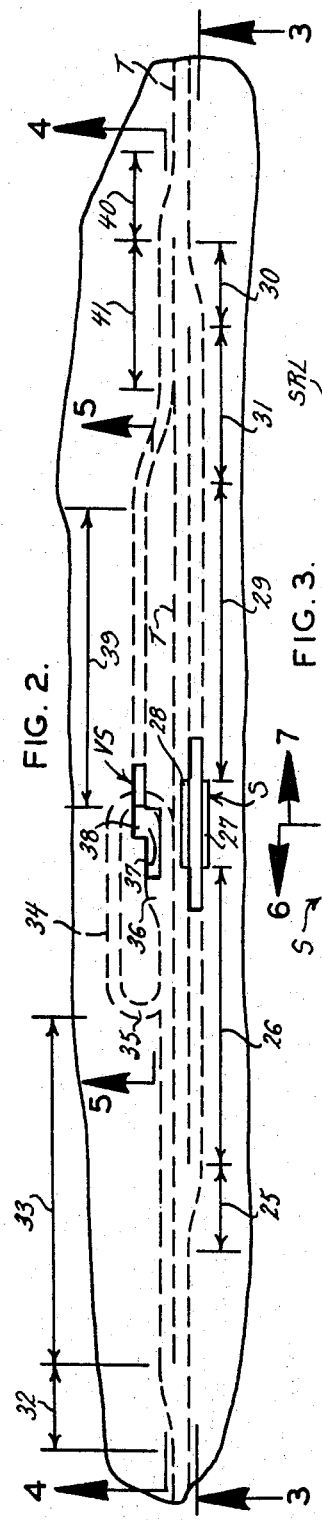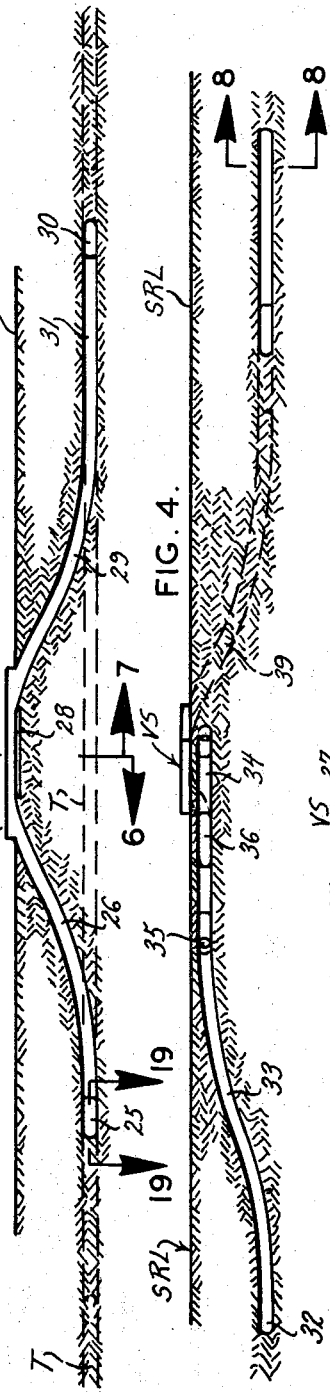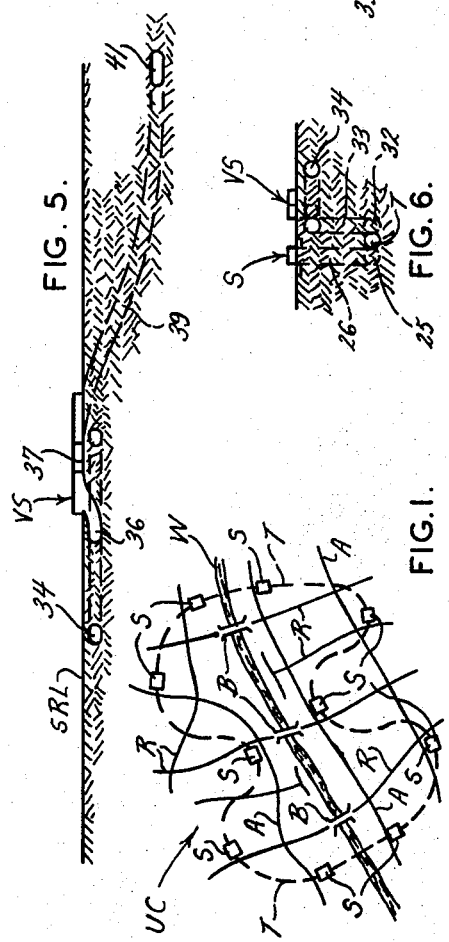

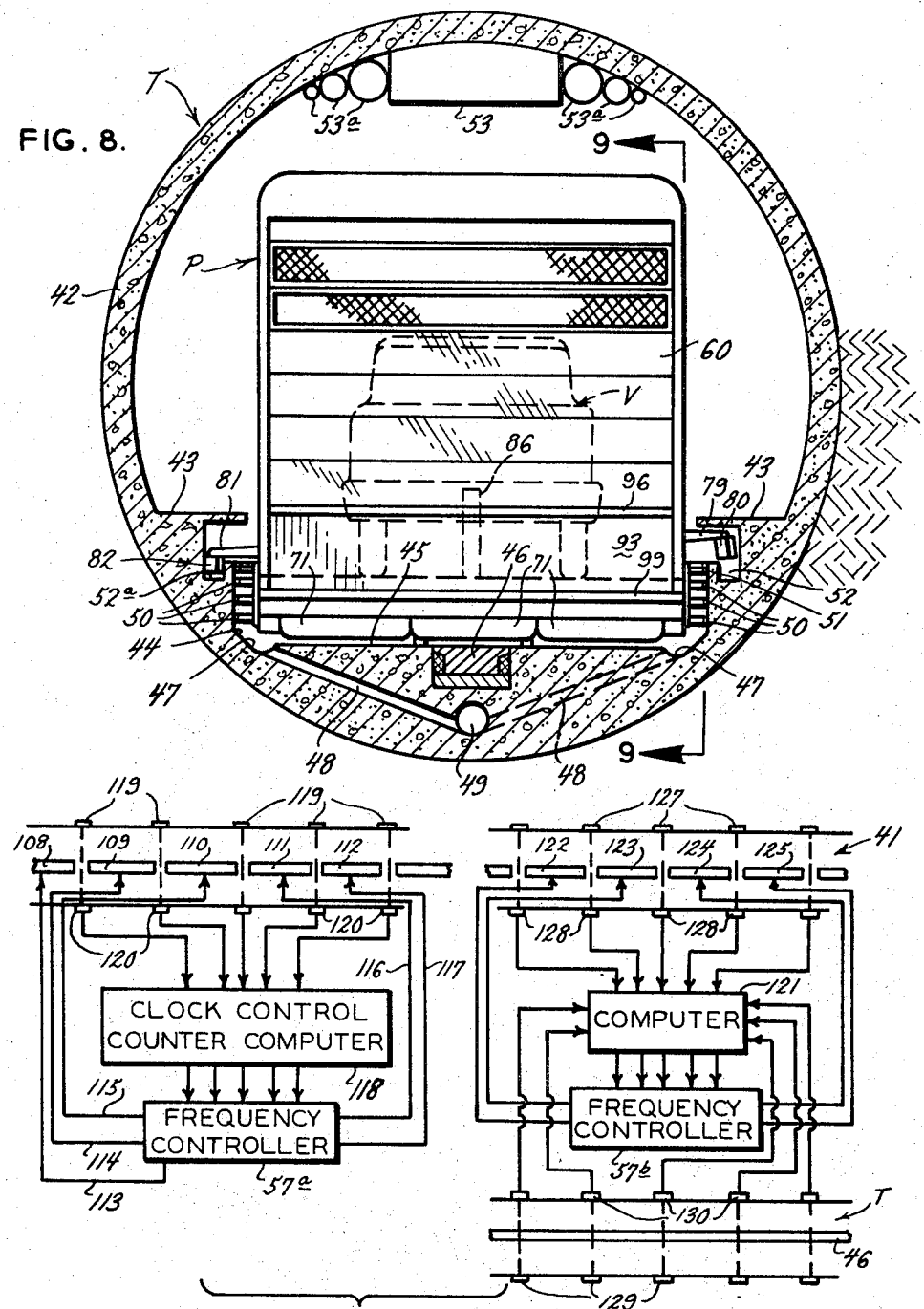

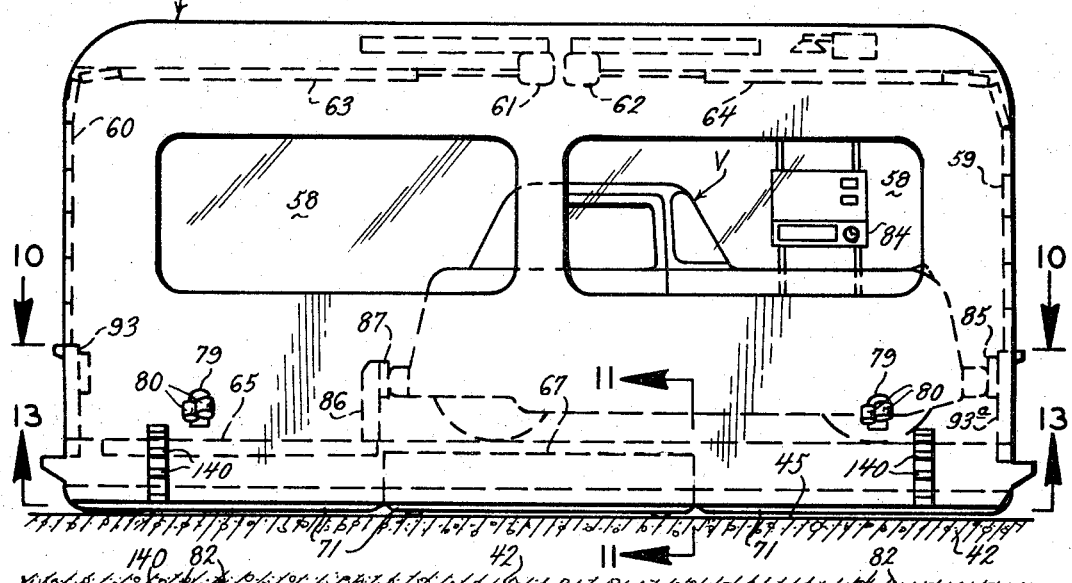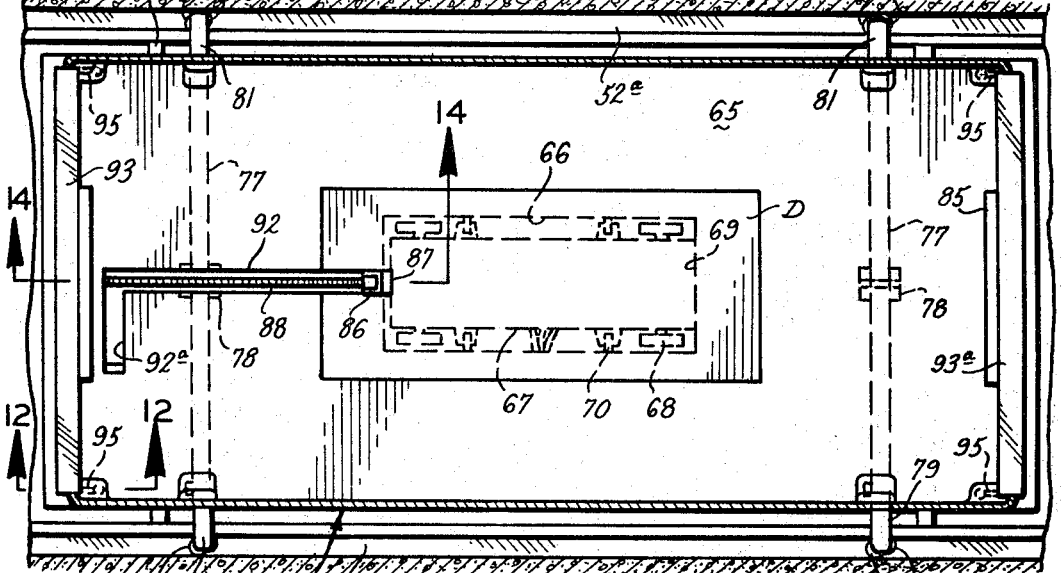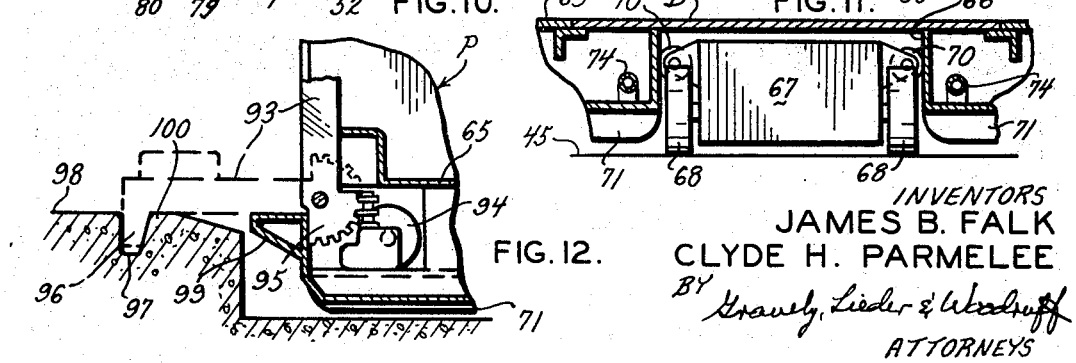

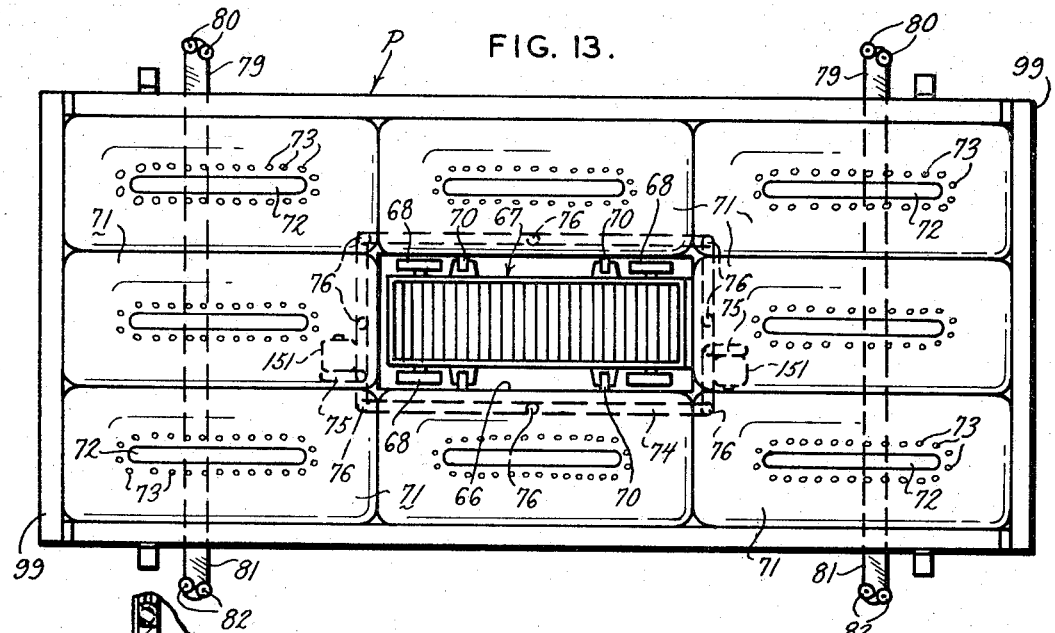
FIG. 13.
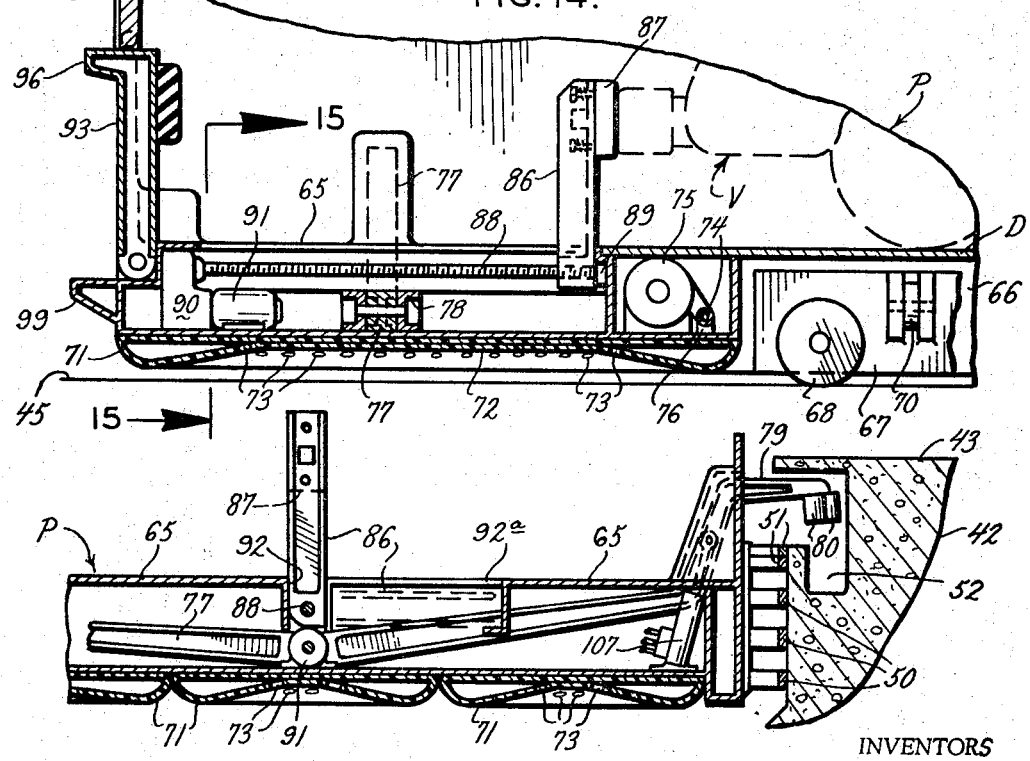
FIG. 14.
FIG. 15.
INVENTORS
JAMES B. FALK
CLYDE H. PARMELEE
BY Gravely, Lieder & Woodruff
ATTORNEYS Feb. 13, 1968  J. B. FALK ET AL  3,368,496

Filed Oct. 7, 1966  7 Sheets-Sheet 5

INVENTORS
JAMES B. FALK
CLYDE H. PARMELEE

INVENTORS
JAMES B. FALK
CLYDE H. PARMELEE

United States Patent Office 3,368,496
Patented Feb. 13, 1968

3,368,496
TRANSPORTATION SYSTEM
James B. Falk, Florissant, and Clyde H. Parmelee, Chesterfield, Mo., assignors to McDonnell Aircraft Corporation, St. Louis, Mo., a corporation of Maryland
Filed Oct. 7, 1966, Ser. No. 585,014
7 Claims. (Cl. 104—18)

ABSTRACT OF THE DISCLOSURE

A transportation system having bodies for moving people, vehicles and cargo in which a substantially level subsurface conveyor of endless or loop configuration is connected by acceleration and deceleration conveyors with a series of load-unload stations at substantially ground surface level such that load carrying bodies can be moving in non-collision courses in the system continuously under the control of means that monitors the effects of gravity, friction and windage losses upon the bodies, and applies motive power in accordance with the need therefore.

This invention relates to improvements in transportation systems and is especially concerned with a high speed, constant high density flow system for urban areas, and with automated control means therefor.

In brief the subject transportation system to be described and claimed incorporates a single mainline in an endless loop situated on a substantially level layout at a selected height below the location of a series of stations, whereby the level mainline can provide non-stop travel between origin and destination and the height between any station and the mainline will be compatible with high speed on the mainline and the ability to take advantage of gravity to accelerate and decelerate through that height. In such a system power is required to make up friction and aerodynamic losses and thus mainly to sustain the speed on the substantially level mainline.

The past practice of satisfying people's urban travel demands by building more and more freeways to accommodate their automobiles is beginning to show a number of adverse effects upon cities. Land condemnation and acquisition for freeways is damaging to the interests of individuals and businesses, it eliminates valuable land from the tax base, and destroys urban vistas and landmarks.

Yet the public has shown again and again a dissatisfaction with rail rapid transit systems and a great preference for the amenities offered by the automobile. However, since everyone, for various reasons, cannot take advantage of the automobile for transportation, a system is required which provides for both the automobile rider and the foot traveler, and for certain types of commercial vehicles, also.

Conventional transportation or rapid transit systems have individual cars operating independently of all others, except that trains or cars operating on fixed tracks cannot be strictly independent unless there are passing zones in the track layout. Most of the present transportation systems for given urban areas are especially concerned with the movement of large numbers of people and very little concerned with movement of surface vehicles in an organized manner. It is also common in conventional transportation systems having a mainline of travel to incorporate a pattern of stops so that movement of people or a load between points of loading and unloading must include intermediate stops. Very little has been done to co-ordinate the movement of people and surface vehicles in a transport system that will tend to reduce the confusion and complexities of present day surface transportation and movement of vehicles, which can and do interfere with each other.

It is, therefore, an object of this invention to overcome a great many of the problems usually found in present day transportation systems, some of such problems being outlined above.

It is an important object of this invention to provide an improved transportation system having high speed characteristics and a method of eliminating unnecessary stops between zones or stations of origin and destination.

It is also an important object of this invention to provide a transportation system that will accommodate itself to mass movement of people, a cargo and vehicles.

Another object of this invention is to provide a transportation system operating according to a method that will make it possible to achieve a higher frequency of service than is possible with present day systems.

Yet another object of this invention is to provide a method of operating a transportation system so that people and vehicles can be moved on a mass basis of their own choosing, that will not require the usual timetable of movement, and will more efficiently serve urban communities.

Still another object of this invention is to provide an improved transportation system that can be placed below ground to minimize energy requirements, reduce expense of land condemnation and acquisition, avoid the withdrawal of land from the tax base of urban areas, minimize the delays due to adverse weather, minimize susceptibility to vandalism, and contribute to the reduction of air pollution in urban areas.

Further objects of this invention are to provide a method of transportation of people and vehicles which accomplish higher average speeds of movement between loading and unloading points, reduce the heavy volume of vehicle movement upon surface streets and avenues, reduce vehicle collisions, arrest the present trends to construction of expensive roads and expressways, provide for driverless palletized movement of people, cargo and vehicles, and avoid needs for excessive numbers of bridges over waterways.

In one possible embodiment of this invention the transportation system may consist of a continuous flow main conveying line placed on a substantially level base in a deep tunnel and operating at a predetermined speed level to handle in palletized manner a high density of people, cargo and vehicles, an arrangement of loading and unloading stations adjacent to the surface so that the advantage of gravity may be obtained for accelerating and decelerating the pallets without reducing the flow rate and an automated control system for inserting and withdrawing the pallets from the main flow line. These and other aspects of the transportation system of this invention will be set forth in greater particularity in the following specification which is related to the several accompanying drawings, wherein:

FIG. 1 is a schematic plan view of an urban area provided with a transportation system of this invention;

FIG. 2 is a greatly enlarged schematic plan view of a typical station for the transportation system of FIG. 1, the view being selected to show a simple form of station layout having the essential needs, but which needs can be duplicated as many times as required.

FIG. 3 is a sectional elevational view of a portion of the station of FIG. 2 taken along line 3—3 thereof;

FIG. 4 is a view similar to FIG. 3, but taken along line 4—4 in FIG. 2 to show a different portion;

FIG. 5 is a view similar to FIG. 3, but taken along line 5—5 in FIG. 2 to show still another part of the station;

FIG. 6 is a transverse sectional view taken along line 6—6 in FIG. 3 to show the relationships of the tunnels;

FIG. 7 is a view similar to FIG. 6, but looking in the opposite direction along line 7—7 in FIG. 3;

FIG. 8 is a typical sectional elevational view of the mainline tunnel taken along line 8—8 in FIG. 4;

FIG. 9 is a side view of a typical vehicle carrying pallet unit shown in FIG. 8, the view being taken along line 9—9 therein;

FIG. 10 is a fragmentary plan view of the pallet of FIG. 9 taken along line 10—10 therein;

FIG. 11 is a fragmentary sectional view taken along line 11—11 in FIG. 9;

FIG. 12 is a fragmentary sectional view taken along line 12—12 in FIG. 10;

FIG. 13 is a bottom plan view of the pallet taken along line 13—13 in FIG. 9;

FIG. 14 is a fragmentary sectional view taken along line 14—14 in FIG. 10;

FIG. 15 is a fragmentary sectional view taken along line 15—15 in FIG. 14;

FIG. 23 is a schematic layout of a typical control section of the transportation system incorporated at the zones of pallet insertion into the main flow line.

Figure 16:
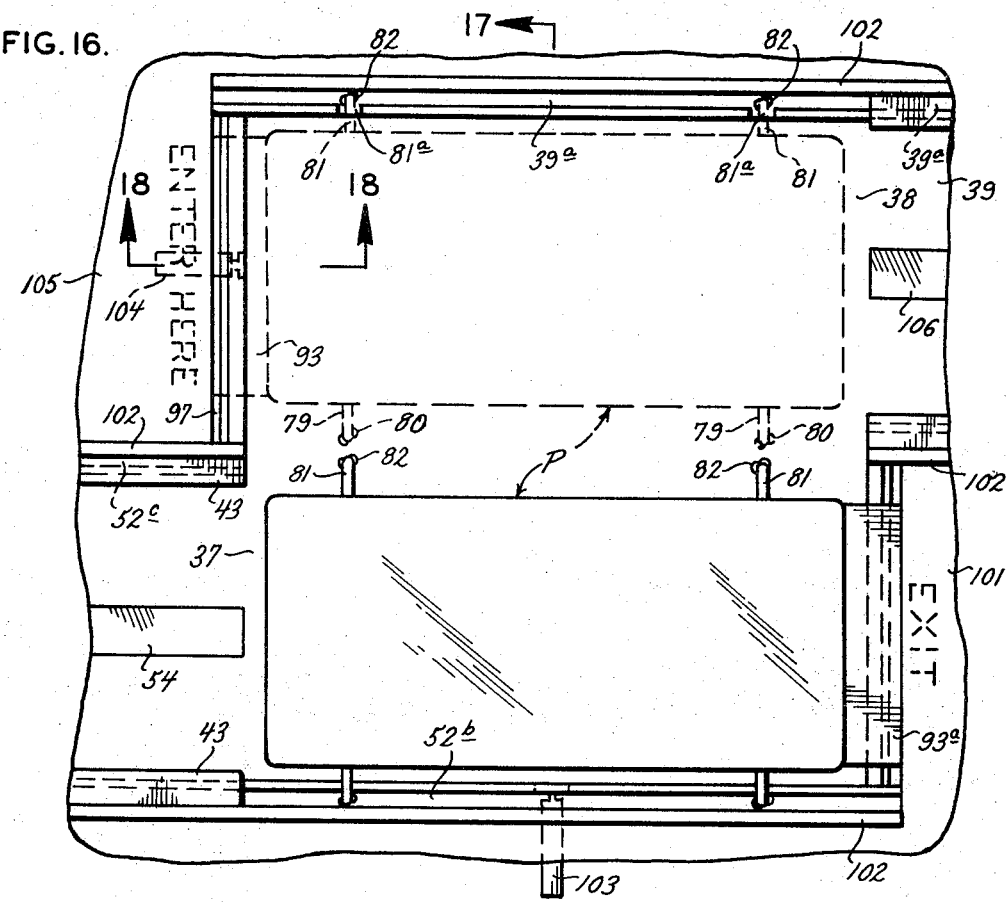
FIG. 16 is an enlarged fragmentary plan view of a typical loading and unloading station for palletized vehicles.

The present transportation system is particularly adaptable to urban centers of population, and as an example thereof attention will be directed to FIG. 1 where the urban center UC is depicted with a waterway W running through the center so that portions of the population are located on each side. The waterway is conventionally crossed by bridges B which connect surface roads R, and such roads connect with avenues A to make up the usual principal network of roads, streets, avenues, expressways, and the like in any typical urban center. The present transportation system for such a typical urban center UC is laid out in a sub-surface right-of-way or in, as shown, a deep tunnel T in which the main flow conveyor means is installed. The tunnel T is located in such relation to the urban center that a maximum of service can be achieved for the needs of both people and vehicle movement. The location of the tunnel T and the several stations S is first determined to provide advantageous places to serve commercial and residential areas. While FIG. 1 is representative of one urban center UC it is obvious that two or more systems, as well as many variations are possible to care for urban centers of a concentrated type (such as New York City) as well as those of a spreadout agglomeration of boroughs or suburban communities (such as Greater New York City, Los Angeles, or Chicago). Therefore, no particular limitations are to be imposed upon the present invention in connection with overall layout, as no attempt will be made to relate the closed loop transportation system to or with any particular urban center.

It is, of course, entirely within the scope of this invention to relate the same to interurban transportation requirements where still further advantages are obtained in constancy of high speed over long distances without drivers or intermediate stops. A still further advantage is that in urban areas the deep tunnel is always available as a shelter for the protection of the population should the need arise.

It should be appreciated that the transportation system to be described herein is conceived to overcome deficiencies in present day systems, and to more efficiently serve the essential needs of urban centers both large and small, as well as interurban relationships. In its basic form the present transportation system consists of a main flow line in an endless or closed loop to accomplish an uninterrupted high speed, high density flow of traffic. In such an endless loop system a plurality of carrier pallets can be operated in a programmed manner so as not to block the flow in the system. By going underground, minimum disturbance to surface structures is achieved, protection from weather conditions is obtained, and advantage is obtained from gravity acceleration and deceleration of the pallets between the surface and the deep tunnel flow line. It is also appreciated that a transportation system which is free of cross traffic can safely operate at high speed and result in more efficient carriage of people and vehicles, especially when such movement is between distant stations.

In the following disclosure the essential features of the transportation system will be set forth, and an example of a typical vehicle transporting pallet will be described, it being understood that the mass movement of people can be achieved in a similar manner with a suitably constructed pallet having accommodations for seating people and for quickly allowing people to get on and off the pallet.

Turning now to FIGS. 2, 3, 6 and 7 the transportation system includes a main line tunnel T arranged at about 120 feet below the station reference level SRL for a system to achieve a velocity on the mainline of about 60 m.p.h. in the tunnel T. The mainline is substantially level at all points so that minimum power is required to sustain the mainline flow. At point 25 (FIG. 2) of the tunnel T a switch is installed to control the removal or turn-out of pallets from the mainline. Once a pallet has been removed at the switch 25 it is directed into an inclined deceleration tunnel 26 which is directed along a predetermined slope to a station structure S. Assuming that such a pallet is carrying people, the pallet (not shown) will decelerate to a safe low speed by the time it reaches the station S and will be propelled between moving walkways 27 and 28 so that the relative speeds between pallet and walkways is low enough for people to negotiate boarding and alighting from the pallet. A speed of the order of that of common escalators is sufficient. That is to say, the walkways 27 and 28 will move at approximately escalator speed relative to the fixed platforms in the stations, and the pallets (not shown) will move at approximately escalator speed relative to the walkways 27 and 28. The length of the walkways 27 and 28 will be selected to afford time for people to board from one side and discharge from the opposite side without stopping the pallet. The pallet, whether loaded, partially loaded, or empty, will continue on through the station and descend through the acceleration tunnel 29 to a switch 30 where it will be inserted into the mainline in tunnel T. However, before reaching the insertion switch 30 the pallet must negotiate a position and velocity-matching section 31 of the acceleration section 29.

In FIGS. 2, 4, 6 and 7 it can be seen that the transportation system includes also a vehicle pallet turn-out switch 32 which leads to a deceleration tunnel 33 which is sloped upwardly to a storage or recirculation tunnel 34 at a level below the vehicle station VS. The recirculation tunnel 34 has a re-entry end 35 (FIG. 2) which directs the pallets toward a run-up switch section 36 which brings the pallets into a vehicle unloading stop 37. After unloading a vehicle from the front the pallet (not shown) is cross-rammed to a vehicle loading stop 38 where it is loaded from the rear and directed into an acceleration tunnel 39. The pallet accelerates to a switch 40 where it is inserted into the mainline tunnel T. However, a vehicle pallet must negotiate a position and velocity-matching section 41 of the acceleration section 39 before reaching the switch 40.

The linear propulsion motor means in the acceleration tunnel sections 29 and 39 will have means for accurately applying power to make up for air drag and friction losses to insure a substantially pure gravity acceleration thus insuring passenger comfort by a freedom from the feeling of accelerating. One system is to have uniform spaced field poles and to vary the motor current frequency in accordance with the pallet location along the acceleration gradient or slope. In other words, the propulsion means can be utilized in a programmed schedule throughout the transportation system to produce substantial passenger comfort with maximum utilization of the system and with minimum power requirements.

As will be described presently, a transportation system having the characteristics above set forth is able to move pallets on a level mainline at high speed to switches where pallets are withdrawn upon predetermined settings of control means without having to slow down to exit or without slowing down or interrupting the mainline flow of pallets. Pallets are continuously inserted into the mainline by negotiating a position and velocity-matching zone where control means adjusts the pallet velocity to the mainline velocity and also matches the position of the pallet to a vacancy in the flow of pallets on the mainline. Once velocity and position matching have been achieved the pallet is ready to be switched into the mainline flow at mainline velocity.

In FIG. 8 there is shown an enlarged cross-section of a typical portion of the mainline tunnel T in which the tunnel bore is provided with a tubular liner 42 of suitable material (reinforced or pre-stressed concrete is suitable) to exclude water, subterranean seepage, and the like. The liner 42 has a pair of service walkways 43 at the sides of a trench 44. The floor 45 of the trench 44 is recessed in its longitudinal center to receive the field poles 46 of a linear electric motor. Gutters 47 in the trench 44 are drained by conduits 48 which empty into a longitudinal collector conduit 49. Each side wall of the trench 44 supports main electric current buss bars 50 and other contacts 51 for furnishing and receiving signals for pallet control equipment (not shown). The trench side walls are recessed at 52 and 52a to provide control tracks for positive pallet switching purposes. The upper area of the tunnel liner 42 is utilized for housing the duct work 53 for ventilation, and for various service pipes and conduits 53a.

Figure 19:
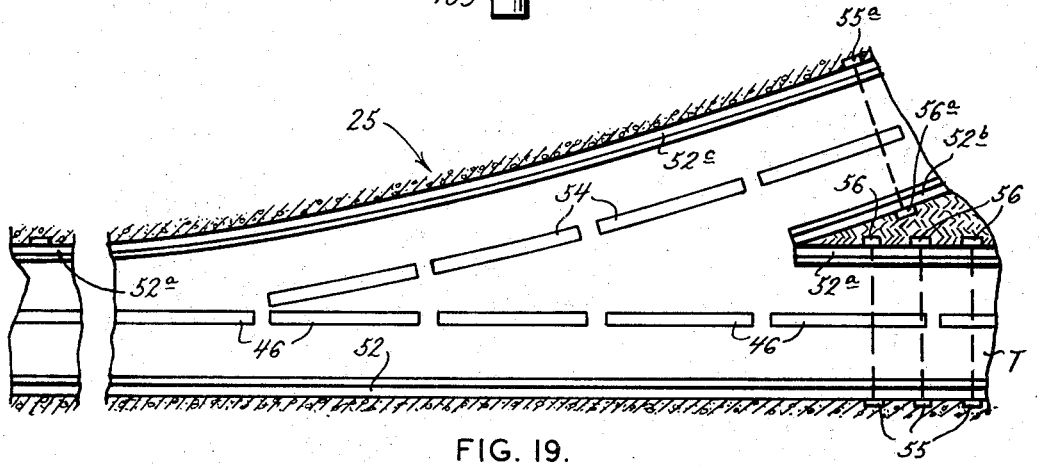
FIG. 19 is an enlarged fragmentary plan view of a switching zone in the mainline tunnel taken along line 19—19 in FIG. 3 to show the essential arrangement for withdrawing pallets from the mainline and sensing a vacancy in the flow of pallets on the mainline.

Referring now to FIG. 19 there is shown a typical switching section of the system, and the view is taken along line 19—19 in FIG. 3. The main tunnel T has its several linear field poles 46 running straight through the switch, and the switch tunnel 25 has its several linear field poles 54 extending centrally thereof. Since the pallets are to be decelerated to a predetermined velocity at the station S or VS, the field poles 54 can be varied as to the current frequency in the field pole coils so that the deceleration occurs in a pre-programmed manner. The tunnel T has an uninterrupted control track 52 at one side and an interrupted control track 52a at the opposite side. The switch section 25 has an interrupted control track 52b at one side adjacent the interrupted control track 52a, and the opposite side of this section has a control track 52c which is a continuation in the switch section and beyond of the mainline control track 52a. It is also shown in FIG. 19 that the mainline tunnel T beyond the switch section 25 is provided with pallet position sensors, consisting of light projectors 55 and photocells 56, to detect the passage of a pallet along the mainline. Similar sensors 55a and 56a may be placed in the switch section 25 to detect the arrival of a pallet destined for the station S or VS. The sensors 55–56 can be arranged in banks along each side to include a length equal to one pallet, or more than one, depending upon the density of pallets in the mainline.

Figure 20:
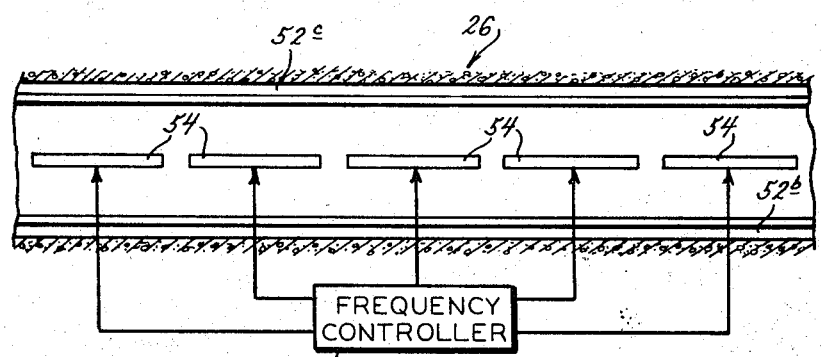
FIG. 20 is a schematic view of a typical acceleration or deceleration section of the system with the field poles connected to a frequency controller for speed control.

It was noted in connection with FIG. 19 that pallet velocity control in the switch section 25 and in the deceleration section 26 could be accomplished by varying the current frequency in the field pole coils of the linear motor. In FIG. 20 such a system is illustrated where the coils for each field pole in the section 26 are supplied with current from a frequency controller 57. This means for controlling the pallet velocity extends through the switching section 25 and the deceleration section 26, or it may be initiated at some selected point beyond the switch section 25.

Attention will now be directed to FIGS. 9 through 15 for the details of one form of pallet P for carrying vehicles, such pallet P having been shown in FIG. 8 with a passenger vehicle V loaded therein. The passenger carrying pallets (not shown) are quite similar to the pallet P except that suitable seats and side loading doors would be provided in lieu of vehicle end doors and ramps. In the several views, the pallet P has a super-structure with windows 58 in the side walls and overhead rollaway end gates 59 and 60. The roof structure houses motor 61 for gate 60 and motor 62 for gate 59, such gates being movable in ways 63 and 64 respectively. The floor structure 65 of the pallet P is provided with a central wall 66 (FIGS. 10, 11, 13 and 14) covered by a removable door D to enclose the linear armature unit 67 of the conveyor motor. Such unit 67 is bodily removable and is supported by wheels 68 (four being shown) running on the floor 45 of the trench 44 for maintaining a precise airgap between armature unit 67 and field poles in the various tunnels. The thrust therefrom is transmitted through the end wall 69 (FIGS. 10 and 13) of the well 66. The relative vertical motion between the pallet P and the armature unit 67 is permitted by side rollers 70.

Means for primarily supporting the pallet and its load might consist of air discharge units 71 of substantially identical form. Each unit 71 is a cell fastened at its central zone by a clamp member 72 (FIG. 13), and formed with a plurality of air outlets 73 distributed about the clamps 72. The air is supplied through a suitable manifold system 74 from a pair of blowers 75, the manifold being connected at 76 to each unit 71. Thus the pallet P is supported in the manner of a hover-car on a layer of air which is drawn from the tunnel T and is recirculated. The blowers 75 are provided in pairs so that if one should fail the other blower will operate to maintain the air flow.

In order to provide for positive reliable switching, controlled at the vehicle rather than in the roadbed, and to avoid a time delay for switch throw, each pallet P is provided with a pair of rocker arms 77 pivoted at center bearings 78 (best seen in FIGS. 14 and 15). The ends 79 of each arm 77 (FIGS. 8 and 15) have rollers 80 which engage in the control track 52 of the trench 44, and the opposite ends 81 of each arm 77 also have rollers 82 which engage in opposite control track 52a As seen in FIG. 8, the rocker arm ends 81 have the rollers 82 engaged in control track 52a so that when the pallet P reaches the switch section 25 (FIG. 19) the arms will cause the pallet P to follow the switch to the left and the armature unit 67 will cooperate with the linear field poles 54 and leave field poles 46. Each pallet is provided with a suitable station indicator panel 84 (FIG. 9) whereby the driver of the vehicle being carried by the pallet can check on the desired destination station. Other services can be included in the panel, such as an intercom unit.

Each vehicle V is held with its front bumper against a resilient buffer 85 (FIG. 9) and the rear bumper is engaged by a snubber arm 86 (FIGS. 9, 10 and 14) carrying a resilient buffer 87. The arm 86 is actuated by a screw rod 88 (FIG. 14) supported in a bearing 89 at one end and by a gear unit 90 at the opposite end. Motor 91 drives the screw rod 88 in reverse directions in the following manner. The pallet floor 65 is formed with a longitudinal slot 92 (FIG. 10) and at one end with a side slot 92a. When the arm 86 is at the side slot 92a the arm may be folded down to the retracted position (FIG. 15) in broken outline. Upon opposite rotation of the screw rod 88 the friction in the parts will move the arm to its vertical position (full line) where it will be stopped by the edge of the longitudinal slot 92. Continued drive of the screw rod 88 will advance the arm 86 in the slot 92 to engage the bumper of the vehicle V (FIGS. 9 and 14). Reversal of the screw rod 88 will first retract the arm 86 toward the side slot 92a and when the arm aligns with such slot it will fold down (FIG. 15) out of the way of another vehicle entering the pallet P.

When loading a vehicle V at the station loading stop 38 (FIG. 2) a run-on ramp 93 at the rear (shown in FIGS. 9, 12, 14 and 18) is actuated by a motor unit 94 (FIG. 12) and sector gear 95 to extended (broken outline) position where a lip 96 engages in a recess 97 in the platform 98. The ramp 93 is supported by a flange 99 on the end of the pallet frame and by a portion 100 of the platform during the loading of a vehicle. Unloading of a vehicle is cared for by a second ramp 93a (FIG. 9) at the opposite end of the pallet, said second ramp being similar to the one above described, and the parts thereof have similar numerals of reference. Gate 59 or 60, of course, must be opened before unloading or loading may take place.

Figure 17:
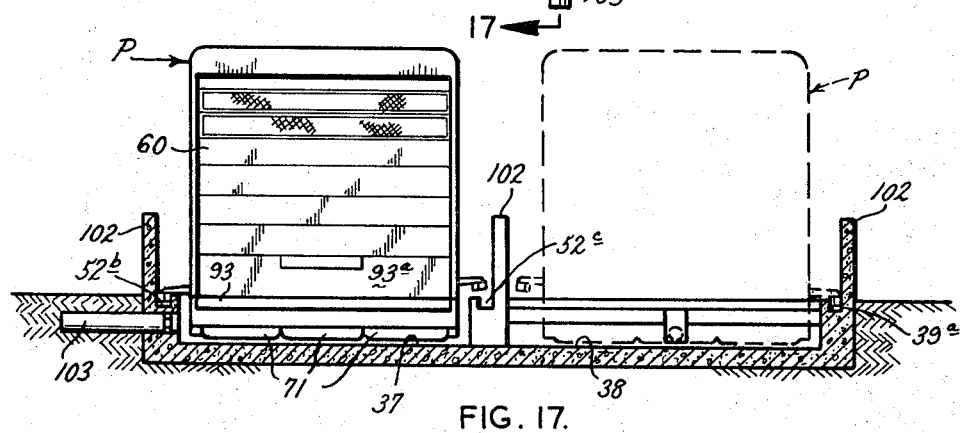
FIG. 17 is a view taken along 17—17 in FIG. 16.
Figure 18:
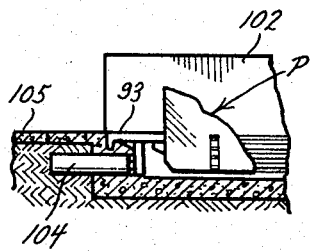
FIG. 18 is a fragmentary view taken along line 18—18 in FIG. 16.

As seen in FIGS. 16 and 17 a vehicle pallet P is shown at a station unloading position 37 in full line where the unloading ramp 93a is positioned to permit the vehicle V to drive off onto the exit roadway 101. Guard fences 102 are provided in the station to direct the movement of the vehicles. After a vehicle has been unloaded the unloading ramp 93a is folded up and a cross-over ram 103 of telescopic type is energized to move the pallet sidewise to the loading position 38 where the loading ramp 93 is lowered to permit a waiting vehicle to drive into the pallet. This vehicle is snubbed up by arm 86, as seen in FIG. 9, the gates 59 and 60 are closed, and the destination station previously given to a station controller will show on panel 84. A launching ram 104 (FIGS. 16 and 18) under the entrance roadway 105 is actuated at the proper time by a station computer (to be discussed later) to move the loaded pallet P into the acceleration tunnel 39 where its armature 67 comes within the influence of the linear field poles 106 in this acceleration tunnel to govern the movement of the pallet P downwardly toward the mainline tunnel T.

The pallet P is presumed to have arrived in position 37 with its control arms 77 positioned so that rollers 82 were in control track 52c and, therefore, these rollers 82 are free. The opposite rollers 80 are also free of track 52b. If the position 38 were to the right of position 37 of the station VS, then the arms 77 would be moved oppositely and rollers 80 would run of of track 52b. As seen in FIG. 16 when the pallet is cross-rammed, the arms 77 have rollers 82 passing through slots 81a in the control track 39a of the tunnel 39. The slots 81a can be avoided by incorporating means to swing arms 77 so that the rollers 82 or 80 clear the tracks which ever are in the way when cross-ramming a pallet.

What has been described above is generally a basic transportation system in which a high density flow of load carrying pallets (load in this sense can include people, vehicles, freight, etc.) is effected on a substantially level main track and access to and from the main track is through stations located as closely as practical to ground level so that a substantially standard elevation (height) can be maintained between station platforms and main track. The underlying principle is to make gravity work for the economy of the system by accelerating pallets toward the mainline so as not to use more power than is needed to overcome friction and aerodynamic losses, and by decelerating pallets on the way toward an elevated station.

The control over traffic or pallet flow may be divided into control of arriving traffic at stations and control of departures or launchings from stations. The general objectives of arriving traffic controls are to avoid collisions and distribute arriving pallets over the available unloading points to maximize the arrival flow rate for any given station. It is understood that some stations will have many unload points for both traffic and vehicles while other stations will have the minimum. The general objectives of the departure controls are to govern departures so that no combination of pallets is dispatched which would result either in collision inside a station or collision with a pallet on the mainline, as well as to distribute departure between loading points in a given station to minimize delays.

Theoretically, in the absence of losses due to rolling or sliding friction and air drag (friction with the air), a pallet could roll or slide down a hill of a given height, then travel along a level road for a while at a speed which is a function of the height of the hill with respect to the level road and then coast uphill to a stop at a height equal to that of the starting position. However, friction losses do occur and account for the fact that the final height (when the velocity is again zero) is always less than the original height. (The height difference is related to the cumulative losses along the entire path.) Several requirements must be met in order to use the theoretical phenomena in a practical manner. First, the stations must act as both origins and destinations; therefore, the height of an unload point must be the same as that of a load point. Second, since various stations feed into the mainline and accept from the mainline, the requirement for constant speed on the mainline must be met. It is sufficient to provide means, only for making up the friction losses as they occur all along the path travelled by any pallet on the system. This means providing just the amount of power to prevent the friction losses from causing velocity changes not in accordance with the desired relationship. This can be accomplished by designing the propulsive means so that its drive speed is synchronized with the theoretical speed at any point along the entire path (from the origin station to the mainline, along the mainline, up to the destination station unload point).

The theoretical relationship which applies is:

$$V=\sqrt{2gh}$$

where:

$V=$Velocity in feet per second at any point on the path with a height (elevation) less than the height (elevation) corresponding to zero velocity (load-unload point).

$h=$Height (or elevation) difference in feet between the zero velocity height (load-unload point) and a point on the path for which the corresponding velocity is desired.

$g=$Acceleration of gravity$=32.2$ feet per second per second (ft./sec.$^2$).

Turning now to FIG. 23 there is shown a schematic view of a control system for effecting velocity and position matching of a pallet with the flow of pallets in the mainline tunnel T. It is assumed that the loaded pallet P (FIG. 16) has been launched into acceleration tunnel 39 and is moving toward a computer-assigned space on the mainline T. Gravity is mainly working on the pallet at this time so that very little electrical energy is required to overcome friction, wind losses, and the like, to bring the pallet up to mainline velocity. Assuming, also, that the mainline is operated at a constant velocity of 60 m.p.h. the acceleration tunnel 39 has an incline whose vertical component is approximately 120 feet into the velocity-matching section 41. At this time the rocker arms 77 are pivoted so that the ends 81 are down with the rollers 82 in the control track 39a which will cause the pallet to switch properly when passing through switch section 40. As seen in FIG. 15, the rocker arms 77 are each actuated by motor means 107 to be explained presently. The linear field poles 106 in the acceleration tunnel 39 (FIG. 16) may be arranged to have current frequency control means as pointed out in FIG. 20.

In the pallet velocity matching portion of the velocity position matching section 41 (schematically shown in FIG. 23); the field pole is divided into sections 108, 109, 110, 111, 112, etc., which are connected by leads 113, 114, 115, 116, 117, etc., into a frequency controller unit 57a, and such unit is wired into a clock control counter-computer 18. Between the respective field pole sections 108, etc., are positioned sensors consisting of spaced light sources 119 opposite photocell units 120, all of which are wired into the computer 118, as shown. This velocity matching portion of the section 41 functions through the signals from the sensors 120 to speed up or slow down the pallet P until it is adjusted to the mainline speed by varying the current frequency of the field pole sections 108, etc. Once adjusted in speed the pallet P passes into the influence of the mainline position matching computer 121 which includes a series of sectionalized field poles 122, 123, 124, 125, etc., wired into a frequency controller 57b, which is, in turn, wired into the computer 121 as shown. The computer 121 obtains information from the movement of the pallet P over the poles 122, etc., by means of light projectors 127 associated with photocell sensors 128 which are wired into the computer 121. The computer 121 also obtains information from the mainline conveyor through light projectors 129 associated with photocell sensors 130 which are wired into the computer, as shown. Having information about the speed of the pallet P in the tunnel section 41 and the presence of pallets and spaces between pallets flowing in the mainline tunnel T, the computer 121 is able to adjust the final position for insertion of the pallet P through the switching section 40 with the accuracy required for high density flow.

Figure 21:
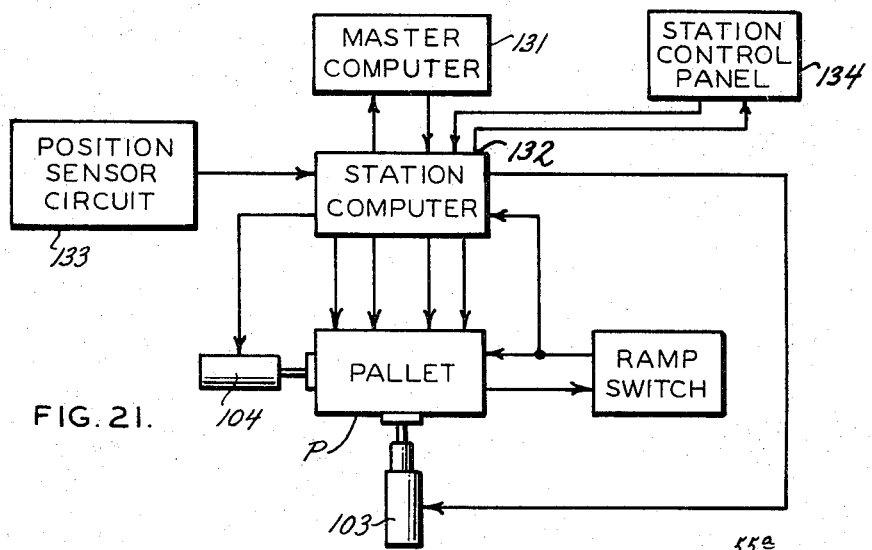
FIG. 21 is a schematic layout of a control system suitable for the present transportation system.

Referring now to FIG. 21 it is seen that a master computer 131 is provided to monitor the entire transportation system and constantly up-date each station S through its individual computer 132 on the movement of pallets in the system. All of the traffic into and out of station S and VS must be handled by computer 132 which is fed information from the pallet position sensor circuit unit 133 which, in turn, obtains information from the sensors 55–56 (FIG. 19) in that portion of the mainline tunnel T following the switch section 25 (or any switch section of similar function) associated with the stations S and VS. Also, each such station is provided with its own control panel 134 (FIG. 21) for regulating the movement of passenger pallets through station S and vehicle pallets through the positions 37, 38 and in the circulating section 34 of the station VS.

Figure 22:
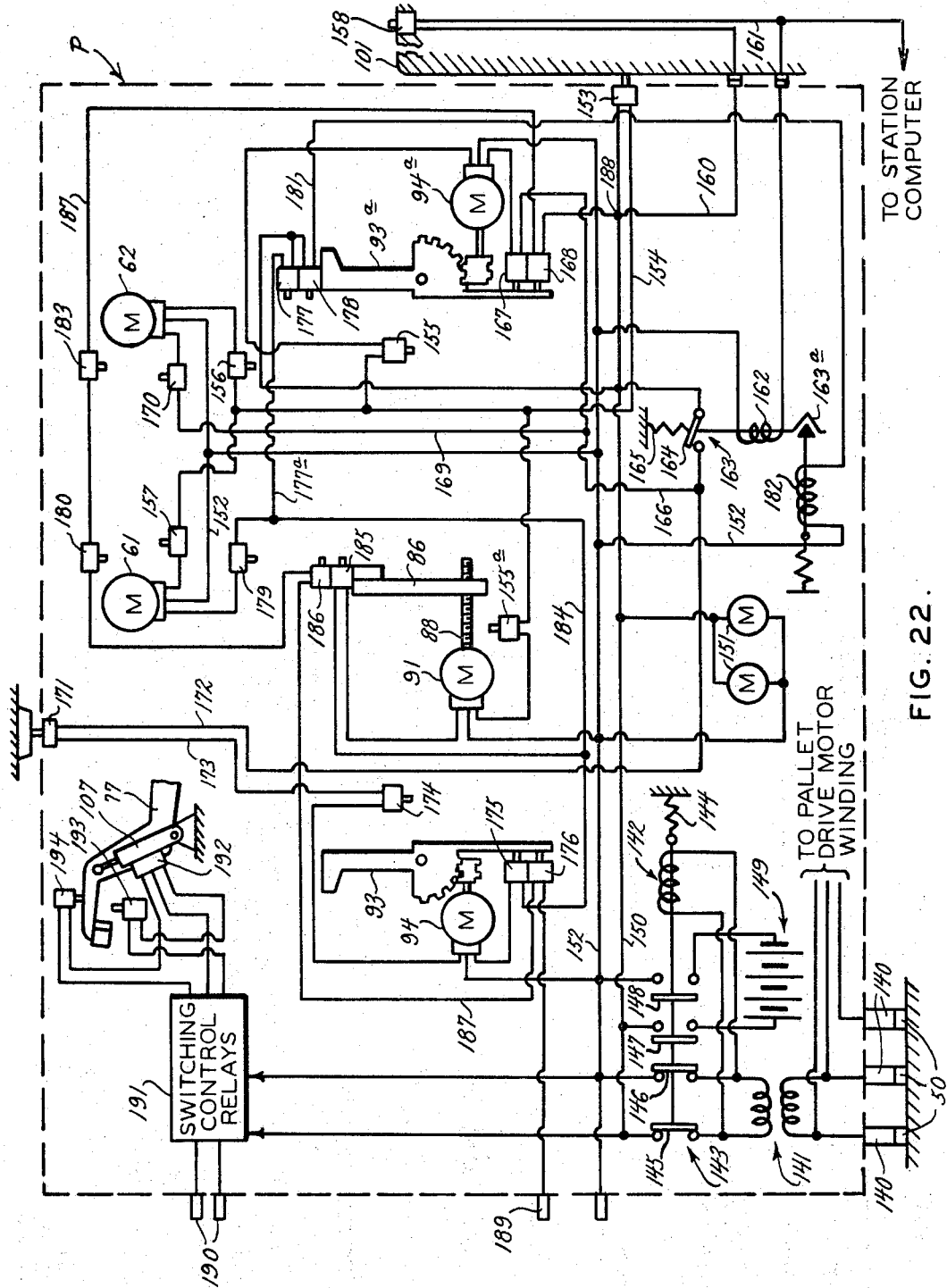
FIG. 22 is a schematic layout of a typical control system associated with a vehicle carrying pallet, such as the pallet of FIG. 9.

One scheme for controlling the functions of the vehicle carrying pallet P of FIG. 9 is diagrammatically shown in FIG. 22 and attention will now be directed thereto. The Pallet P is shown in outline by the broken line framing the circuit layout. The principal source of electrical power is taken from buss bars 50 on pick-up 140 so that there is available 3-phase power for the drive motor consisting of the field poles 46, 54, 106, etc., in the tunnel, and the armatures 67 on the pallets. Any two of the bars 50 may be used to supply the primary of a transformer 141, and when the contact is established and maintained current will be provided for the holding coil 142 of the control switch 143. The switch 143 is biased by a spring 144 to open contacts 145–146 in the secondary side of transformer 141 and close contacts 147–148 in the circuit to battery 149; thus, there are two sources which together provide continuity of electrical power.

Closing switch contacts 145–146 in the manner indicated establishes a circuit in lead 150 to motors 151 for blowers 75 and back to the return lead 152. It also establishes a circuit through normally open limit switch 153 (closed when pallet P is in station stop position 37 with its front end adjacent the vehicle exit ramp 101) to lead 154, normally closed limit switch 155 and motor 94a operating the front drive-off ramp 93a. In all cases lead 152 is the return lead of the circuit. At the same time current from lead 154 goes through limit switch 155a to drive motor 91 to retract snubber arm 86, and current is supplied through normally closed limit switch 156 to motor 62 opening the front door 59 and to normally closed limit switch 157 to motor 61 opening rear door 60. When the front ramp 93a is opened properly it opens limit switch 155 to stop the motor 94a. Likewise, when doors 59 and 60 are properly open they open limit switches 156 and 157 stopping the motors 62 and 61. The sunber motor 91 retracts arm 86 until it is retracted into the floor 65 (FIG. 15) and it opens switch 155a. The vehicle V in pallet P may now be discharged and in so doing it closes ramp switch 158 to close a circuit from lead 160 to lead 161 running to the station computer 132 and to a actuating coil 162 for switch 163 which closes normally open contact 164 against spring 165 in the latched position by latch 163a. Contact 164 when closed makes a circuit 166 to front ramp motor 94a through normally closed limit switch 167 for retracting the ramp whereby it will open switch 167 in its retracted position and simultaneously close normally open limit switch 168. The circuit 166 also includes branch circuit 169 through normally closed limit switch 170 to front door motor 62 which closes the front door 59.

At this time the condition of the pallet P is such that it may be cross-rammed by the means 103 (FIG. 21) since a signal has been received at the station computer 132 from circuit lead 161 that the vehicle has emerged from the pallet. As the pallet reaches station position 38 (FIG. 16) a limit switch 171 is closed completing a circuit 172 and 173 to a normally closed limit switch 174 and motor 94 to open the rear ramp 93. When the ramp 93 is open it opens switch 174 stopping motor 94, and it also allows limit switch 175 to go to normally closed position, and allows switch 176 to go to normally open position. The pallet may now be loaded with another vehicle. The vehicle moves in until it closes switches 177 and 178 which are normally open. The closing of switches 177 and 178 supplies current through normally closed switch 179 to operate motor 61 to close the rear door which then closes normally open switch 180, and it also supplies current to circuit 181 which actuates reset coil 182 of switch 163. The closing of the front door 59 previously described effects closing of normally open switch 183, and the closing of the front ramp closes switch 168 previously described. It is noted in FIG. 22 that the circuit 177a to rear door motor 61 also completes a circuit 184 to normally open switch 185 which is held closed by the snubber arm 86 when in the snubbed position (FIG. 15). The arm 86 also closes limit switch 186 which is normally open when not in contact with the vehicle bumper to hold it in snubbed-up condition. When the rear ramp 93 is retracted it closes limit switch 176. At this time the closing of limit switches 168 and 176 at the front and rear ramps, switches 180 and 183 at the rear and front doors, and switch 186 at the snubber arm completes a signal circuit 187 from connection 188 in current lead 150 to the pallet pick-up contact 189 where a station connection is made to transmit a signal to the computer 132 indicating the pallet is loaded and ready to be launched.

Still referring to FIG. 22, and assuming that the pallet is in the position 38 of FIGS. 2 and 16 ready for launching, the station computer will send a signal to contacts 190 and this will be received by a switching control relay 191. The relay 191 is operably connected to a reversible control unit 192 which determines the direction of movement of the motor means 107 connected to position the arms 77 (only one being shown). The control unit 192 is in an appropriate circuit with limit switches 193 and 194, as shown, to stop action of the motor means 107 and set the circuit for reverse action. The signal to control relay 191 will in this instance move arm 77 down so that the end 81 with rollers 82 will ride in track 39a as the pallet is launched from the station position 38 (if not already set that way). The actual launching by ram 104 will take place when the station computer 132 has obtained proper data from means 133, the station control panel 134, and the master computer 131 so that the pallet P will be initially timed to enter the mainline T in a vacancy between other pallets. The final insertion maneuver for pallet P will be carried out by means disclosed in FIG. 23, previously discussed.

It is, of course, understood that there are possible a number of variations for the transportation system shown and described. For example, the stations S in the system can vary from very simple track layouts to multiple track layouts where pallet switching to right and left of a through line will be required, and where extensive holding and related recirculating tracks are required to meet high density flow requirements for freight and vehicle carrying pallets. It is also possible to select mainline speeds that will satisfy different urban needs and that this will be a function of how deep or shallow the mainline must go relative to an average station level. All of these variations are to be included in the scope of the appended claims.

What is claimed is:

1. In a transportation system for people, automotive vehicles and cargo the combination comprising: a plurality of transporting pallets; a series of load-unload stations disposed substantially at ground level; a substantially level subsurface conveyor for receiving and discharging said pallets, said subsurface conveyor operating at substantially uniform velocity and forming an endless loop for circulating said pallets below said series of stations; first conveyor means extending downwardly between each station and the level of said subsurface conveyor and operably connecting each load-unload station to said subsurface conveyor; second conveyor means extending upwardly between and connecting said subsurface conveyor and each station; power means in each conveyor to propel said transporting pallets, said propulsion means driving said transporting pallets at predetermined speed at any point along the path of said conveyors according to the formula $V=\sqrt{2gh}$; control means in said system to effect velocity and position matching of each transporting pallet on said subsurface conveyor and from said series of stations and back to said stations; means operable between said conveyors and transporting pallets to switch said transporting pallets into and out of said subsurface conveyor at said first and second conveyor means, switch means being responsive to said control means; and means at said load-unload stations to effect the loading and unloading of people, automotive vehicles or cargo relative to said transporting pallets.

2. The transportation system of claim 1 wherein said loading and unloading means includes moving load support means having a velocity less than the velocity of said transporting pallets adjacent thereto.

3. The transportation system of claim 1 wherein stationary platforms are arranged in laterally spaced positions and ram means operatively shift transporting pallets between said platforms, at least one platform registering with said first conveyor means and at least one platform registering with said second conveyor means.

4. The transportation system of claim 1 wherein said first and second conveyor means are operably connected in said load-unload stations, said power means maintains movement of said transporting pallets through said stations, moving load bearing support means are disposed adjacent both sides of the path of movement of said transporting pallets, and drive means is operatively connected to said support means to drive the latter at velocities less than said transporting pallets.

5. The transportation system of claim 1 wherein suspension means separate from said power means is provided on each transporting pallet.

6. The transportation system of claim 1 wherein said control means includes a master controller for the entire system and separate station controllers operably connected to said master controller, said master controller responding to the positions of all pallets on said subsurface conveyor to update the separate station controllers.

7. A transportation system comprising: load transporting bodies; a series of load-unload stations; a subsurface conveyor for said bodies extending along in an endless loop at a position below said series of stations and being substantially level throughout; acceleration conveyors extending along downward gradients from each of said stations to the level of said subsurface conveyor; first positive switch means connecting each of said acceleration conveyors into said subsurface conveyor; deceleration conveyors extending along upward gradients from said subsurface conveyor into each of said stations; second positive switch means connecting each of said deceleration conveyors into said subsurface conveyor; means in each station operatively connecting said acceleration and deceleration conveyors to provide a path of movement for said bodies between said acceleration and deceleration conveyors; accurate body position and velocity matching means in each acceleration conveyor; said conveyors and bodies in the system including linear motor means; master control means for the system to keep track of all bodies in the system; and secondary control means operatively connected to each of said body position and velocity means to accurately match position and velocity of each body moving on said acceleration conveyors with closely spaced bodies moving in the vicinity thereof on said subsurface conveyor.

References Cited

UNITED STATES PATENTS

| | | | |
|---|---|---|---|
| 432,615 | 7/1890 | Henning | 104—138 |
| 825,245 | 7/1906 | Saver | 104—138 |
| 2,978,092 | 4/1961 | Phillips et al. | 198—79 X |
| 3,224,550 | 12/1965 | Nigrelli et al. | 198—32 |
| 3,233,559 | 2/1966 | Smith et al. | 104—148 |
| 3,242,876 | 3/1966 | Berggren | 104—134 |

EVON C. BLUNK, *Primary Examiner.*

M. L. AJEMAN, *Assistant Examiner.*